United States Patent [19]

Eckelmeyer

[11] 4,271,379
[45] Jun. 2, 1981

[54] WEB FED PRINTING PRESS MOTOR CONTROL

[75] Inventor: Edward H. Eckelmeyer, Noank, Conn.

[73] Assignee: Harris Corporation, Melbourne, Fla.

[21] Appl. No.: 974,541

[22] Filed: Dec. 29, 1978

[51] Int. Cl.³ .............................................. H02P 5/46
[52] U.S. Cl. ...................................... 318/77; 318/39; 318/78; 318/113; 318/6; 318/5
[58] Field of Search ...................... 318/77, 39, 78, 113, 318/6, 5; 226/108, 109

[56] References Cited

U.S. PATENT DOCUMENTS

| 3,156,397 | 11/1964 | Davies | 318/6 X |
| 3,809,335 | 5/1974 | Mantey | 318/6 X |
| 3,913,900 | 10/1975 | Muster et al. | 318/6 X |
| 4,051,415 | 9/1977 | Martin | 318/77 X |
| 4,126,817 | 11/1978 | Luzio | 318/6 X |

Primary Examiner—Ulysses Weldon
Attorney, Agent, or Firm—Yount & Tarolli

[57] ABSTRACT

A web fed press has at least one press unit including a first web driving means driven by a first motor. Downstream from the press unit is a second web driving means, such as nip rolls, driven by a second motor. Encoders are associated with the motors to produce pulse trains which are compared for motor speed relationship. If the relationship is not correct, the energization of the second motor is varied to correct the error. The relative web speed at the two locations is adjusted by effectively varying the number of pulses per revolution produced by the encoder for the second motor.

9 Claims, 4 Drawing Figures

WEB FED PRINTING PRESS MOTOR CONTROL

BACKGROUND AND FIELD OF INVENTION

This invention relates to the art of web fed printing presses and, more particularly, to motor control circuitry for controlling the speed of web material as it is passed through a press unit and is then subsequently redirected, as to a utilization device, such as a folder.

Whereas the invention is described herein with particular reference to controlling the speed relationship of a motor driven press line shaft and a motor driven nip roll, it is to be appreciated that the invention may be used in various press applications requiring the ability to vary the web speed relationship at different locations in the path of movement of a web.

In a web fed printing press it is typical for a web to be fed through one or more printing units where impressions are made in one or more colored inks with the web then being directed to a nip roll prior to being supplied to a utilization device, such as a folder. The nip rolls (frequently referred to as pinch rolls where one is driven and the other is an idler) may be set to impart, by a pulling force, a slightly greater surface speed to the web then that imparted by the press unit. This is done to maintain proper tension. Thus, as the web is fed through the press unit it is dampened by the wetting effect taking place during the printing operations and this will cause the web to stretch slightly. In order to maintain proper tension, the nip rolls impart a slightly increased surface speed.

Conventionally, the nip rolls are geared to the press line shaft which is used to drive all of the press units. In order to achieve a slightly different web speed at the nip rolls, a variation may be made in the gearing ratio interconnecting the press line shaft with the nip rolls. However, it is more conventional to employ nip rolls of a diameter to achieve the web surface speed desired. This, however, does not permit easy adjustment in relative speed between nip rolls and the press unit as any such adjustment will require changing the nip rolls or changing the gearing between the nip rolls and the press line shaft. This is awkward and time consuming. If the nip rolls be motor driven independently of the motor driven press line shaft, then the motors must be synchronized. Motor control systems for synchronizing the speed of motors are well-known and it is conventional to use a phase lock loop technique. This requires that a pulse encoder be connected to the motor shaft at each motor so that the motor speeds may be synchronized or locked by supplying pulses from the encoders to a phase lock loop circuit. Here, the two pulse trains are compared and if the relationship is not correct, a corrective signal is supplied to one of the motors to speed it up or slow it down until pulse synchronization is obtained.

Such a phase lock loop motor control system will not, however, permit easy adjustment of the relative speed of the nip rolls with respect to the press unit in the press environment discussed above. To achieve relative speed adjustment will require some way of varying the number of pulses per revolution produced by one of the shaft encoders. This then would then require changing the shaft encoders in order to achieve different relative speeds.

It is therefore a primary object of the present invention to provide adjustments in the relative speed of a web at different locations without making changes in gear ratios or nip roll diameter.

It is a further object to employ a motor driven press line shaft and a motor driven nip roll and to adjust the speed relationship therebetween without changing one of the motor driven encoders.

The present invention contemplates the provision of a web fed printing press having at least one printing unit. A first motor drives, as by way of a press line shaft, a first web driving means, such as a printing cylinder-blanket cylinder couple in the press unit, so as to impart motion to the web. Downstream from the printing unit, a second web driving means, such as nip rolls, driven by a second motor also imparts motion to the web prior to it being directed to a utilization device, such as a folder.

In accordance with the present invention, the relative web speed at the two motor driven means is controlled. A first pulse train is provided at a pulse rate dependent on the speed of the first motor and a second pulse train is provided dependent on the speed of the second motor. These pulse trains are compared for motor speed synchronism and if the speed relationship is not correct then the energization of the second motor is varied to achieve the proper speed relationship. The relative speed may be varied by effectively changing the number of pulses per revolution in the second pulse train.

BRIEF DESCRIPTION OF THE DRAWINGS

The foregoing and other objects and advantages of the invention will become more readily understood in the following description of the preferred embodiment of the invention as taken in conjunction with the accompanying drawings which are a part hereof and wherein.

DETAILED DESCRIPTION

Figure 1:
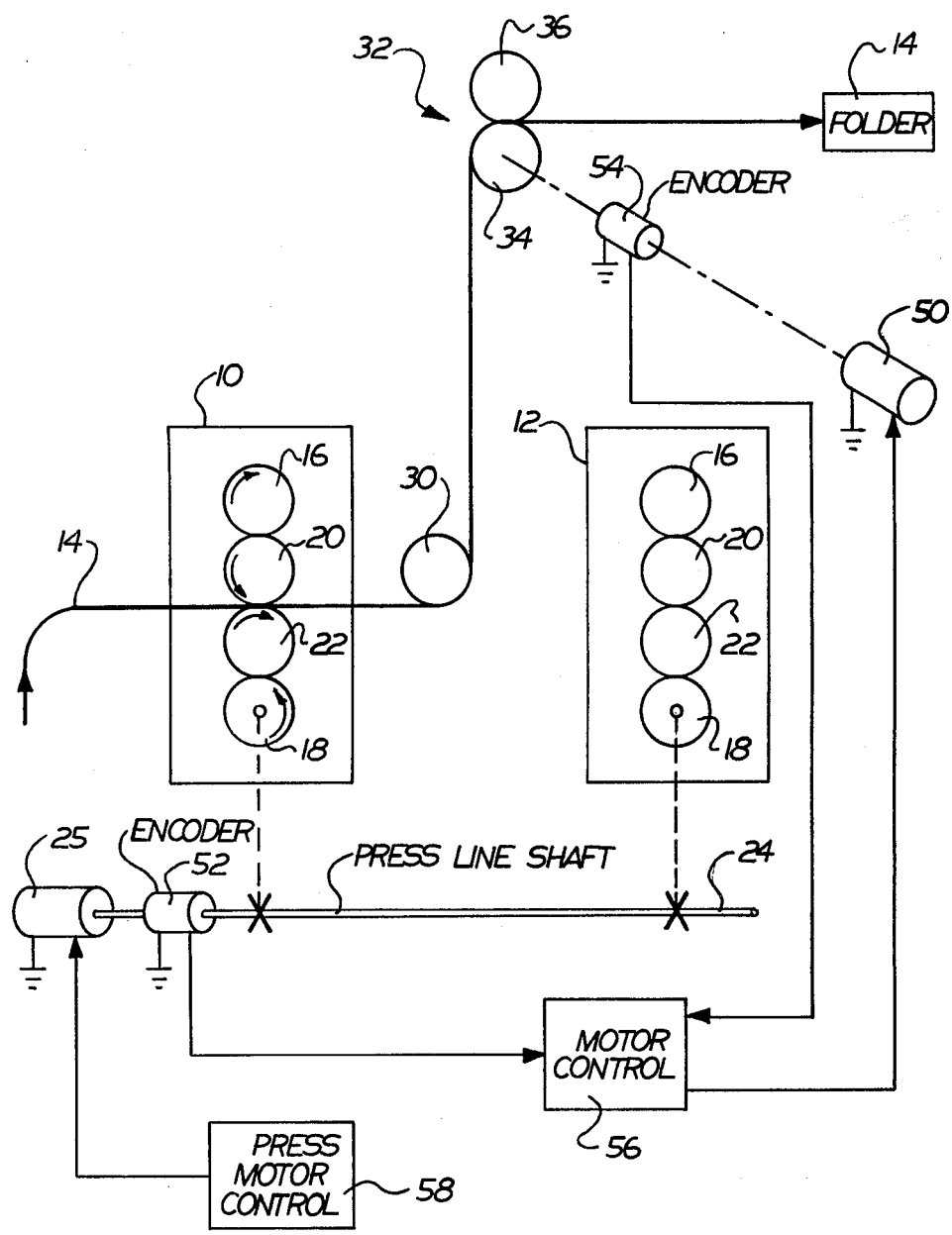
FIG. 1 is a schematic illustration of one application of the present invention.

Referring now to FIG. 1 there is shown one application of the present invention as applied to a web fed press having a plurality of press units, such as press units 10 and 12. As is known in the art, a web, such as web 14 is supplied from a suitable storage reel (not shown) to one or more press units where impressions are made in one or more colored inks and is then directed to a press utilization device, such as a folder unit 14. Each of the press units 10 and 12 is conventional and, for example, may include upper and lower plate cylinders 16 and 18 together with upper and lower blanket cylinders 20 and 22. These cylinders are all arranged in a known manner, as shown in FIG. 1. Typically, in such a multiunit press, all of the press units are driven by common drive, such as a press line shaft 24 through a geared coupling as schematically shown in the drawings. This coupling is between the press line shaft and the lower press cylinder 18. The cylinders are all geared to each other within a press unit so that as cylinder 18 is driven in a direction as indicated by the arrows, cylinders 16, 20 and 22 are also driven as indicated by the arrows thereon.

A web may be threaded between blanket cylinders 20 and 22 so as to obtain printing on two sides, as is indicated in FIG. 1, or may be threaded between a plate cylinder and a blanket cylinder for printing on only one side. The cooperating cylinders, such as cylinders 20 and 22 in FIG. 1, impart surface forces to the web 14 so as to provide a driving force therethrough and, hence, obtain a level of surface speed. The tension thus created causes the web 14 to be pulled from a suitable storage reel (not shown) for supplying of the required web material.

After the web 14 leaves press unit 10, it may be directly fed to a folder 14, as shown, or may be first threaded through one or more additional press units. A suitable guide rule 30, located outside of the press unit, will serve to direct the web either in an upward direction, as shown in FIG. 1, or in a downward direction so that the web may be passed around the next printing unit on its way to the folder. As the web passes through the printing unit 10 it stretches due to the wetting effect taking place during the printing operation and, hence, in order to maintain proper tension of the web as it is directed to the folder, the surface speed must be slightly increased. This is accomplished with nip rolls 32 which impart a slightly increased surface speed to the web downstream from the printing unit 10. The nip rolls 32 include a driven nip roll 34 and an idler nip roll 36.

Typically, driven roll 34 is driven by the press line shaft 24 which is, in turn, driven by a suitable motor 25. The web speed differential at the nip rolls with respect to the press unit is attained by proper choice of the diameters of the nip rolls 32. This, however, will not permit easy adjustment to attain a different relative speed.

In accordance with the present invention, nip roll 34 is independently driven by a second motor 50. However, to attain synchronism in the motor operations, motors 25 and 50 are provided with shaft encoders 52 and 54, respectively. These encoders are known in the art and each serves to provide a given number of pulses per revolution. These pulses are supplied to a motor control circuit 56 constructed in accordance with the invention. The press speed will be controlled by a typical press motor control circuit 58 which can be operator controlled to bring the press up to speed, such as on the order of 1500 revolutions per minute. The motor control circuit 56 will cause the nip roll 34 to be driven so as to follow the speed of the press line shaft 24. In order to achieve relative changes in the speed relationship between press unit and the nip rolls, motor control 56 is provided with means for adjusting the number of pulses produced per revolution of encoder 54 so as to thereby electronically vary the encoder pulse rate, as opposed to changing encoders. This permits easy adjustment of the relative speed relationship during press run operations so that the operator may trim and finally adjust the speed relationship.

Figure 2:
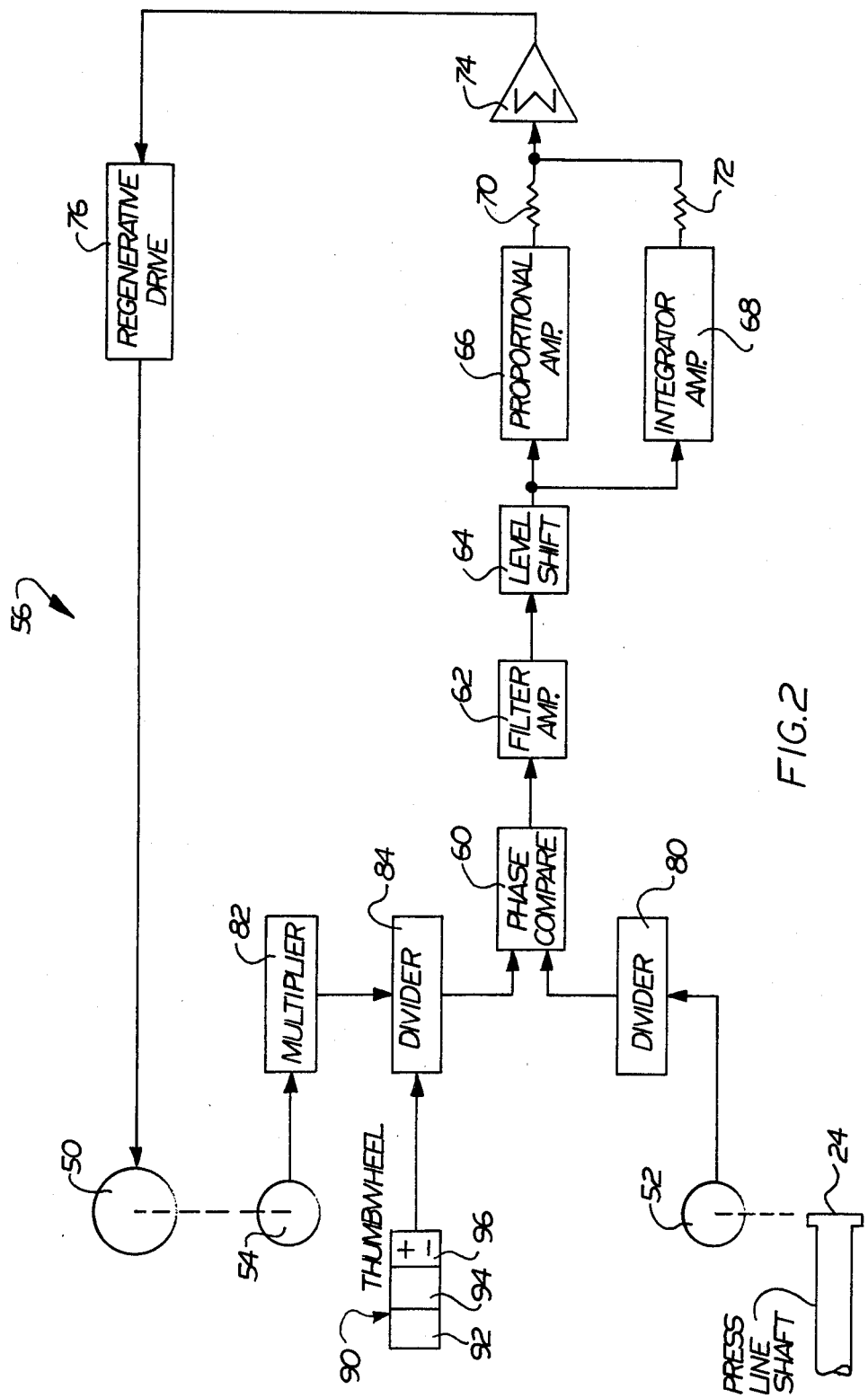
FIG. 2 is a combined schematic-block diagram illustration of the motor control circuit constructed in accordance with one embodiment of the present invention.

Motor control circuit 56 is illustrated in greater detail in FIG. 2 to which reference is now made. Each of the encoders 52 and 54 supplies a pulse train which is conditioned by multiplier and/or divider circuits, to be described hereinafter. These supply two pulse trains to a phase comparator 60. The pulse trains, as they are supplied to the phase comparator, are chosen so that when the press is running at rated speed and the gain of the driven roll 34 is 0.0%, each pulse train has a frequency of 100 Hz. The phase comparator 60 preferably takes the form of an integrated circuit, phase lock loop, such as that supplied by RCA under Model No. CD4046. This phase comparator serves to sense any inequality in either the phase or the frequency between the two pulse trains. This circuit serves to provide a positive voltage on the order of less 15 volts if the nip roll is running too slow and a 0 voltage output if the nip roll is running too fast and an open circuit state if the press and nip motor are running at exactly equal speeds. This output, from the phase comparator 60, is filtered by a suitable filter amplifier 62 which provides some degree of level shifting. This output is again level shifted by a level shifting circuit 64 so as to provide a DC signal having a polarity and magnitude proportional to the phase and frequency difference between the two input pulse trains. This signal represents the speed error between the press and nip rolls. This error signal is then supplied to a proportional amplifier 66 as well as to an integrator amplifier 68. The proportional amplifier may have a gain on the order of 0.5 and will have essentially a 0 output voltage when the motors are running at the correct speed. However, the integrator amplifier (provided with a capacitor in its feedback path) provides an output which remains at the DC level required to make the motor run at the correct speed. These signals are supplied by way of summing input resistors 70 and 72 to a suitable summing amplifier 74, having proper scaling. The output of the summing amplifier is supplied to a conventional regenerative drive circuit 76 which will then speed up or slow down motor 50 in the proper direction to make the proper adjustments to the pulse trains applied to the phase comparator 60.

Pulse encoders 52 and 54 may take various forms and, for example, encoder 52 may provide 504 pulses per revolution and encoder 54 may provide 256 pulses per revolution. At rated press speed of 1,500 revolutions per minute, the pulses from encoder 52 will exhibit a frequency on the order of 12,600 Hz. These pulses are supplied to a divider circuit 80 which serves to divide by a number, in this case 126, so that the output pulse train from divider 80 will exhibit a frequency of 100 Hz at the rated press speed. The objective, with 0.0% gain by driven roll 34, is to provide the output of encoder 54 with circuitry so that it also supplies a pulse train exhibiting a frequency of 100 Hz to the phase comparator 60. With the encoder 54 providing 256 pulses per revolution it will exhibit, at the rated press speed, a frequency of 7,462 Hz. In order to convert this to a pulse train having a frequency of 100 Hz, there is provided a multiplier circuit 82 and a divider circuit 84. The multiplier circuit serves to multiply the pulse train by a factor of 134 so that the output of the multiplier is a pulse train exhibiting a frequency, at the rated press speed, of 1.0 MHz. This pulse train is divided down by a divider circuit 84 by a factor of 10,000 so that the output pulse train from the divider, at the rated press speed with 0.0% gain by roll 34, will be 100 Hz or exactly the same as the divided down rate from the press line shaft encoder 52.

In accordance with the present invention, adjustments of the relative speeds of the press line shaft 24 and the driven roll 34 can be had by effectively changing the number of pulses per revolution provided by encoder 54. That is, small variations in the nip roll motor speed above and below the press speed (i.e., 0.0% gain) may be achieved by fooling the control circuitry into thinking that the pulse encoder 54 is putting out more or less pulses per unit time then it is supposed to. This would force the control circuitry to slow down or speed up the motor, as required, so that the correct pulse frequency is generated. This could be achieved by physically replacing encoder 54 with a different encoder providing a different number of pulses per revolution.

In accordance with the present invention, this is achieved electronically by the divider circuit 84 together with manually adjustable thumbwheel switches 92 and 94 together with a plus-minus switch 96. The divider is set to divide by a factor of 10,000 and this factor may be changed by the thumbwheel switch 90 between the limits of plus or minus 99 to achieve a factor of 10,999 or 9,901. Placing switch 96 in its positive position adds, to the factor of 10,000, a number as much as 99. Placing the switch in its negative position subtracts a number as much as 99.

Assume the motor is running at 0.0% gain, and at maximum press speed (where motor and encoder RPM = 1749.067). The nip roll encoder frequency into the comparator circuit is calculated as follows:

Encoder $PPR$ × Encoder $RPS$ × Multiplier/10,000 =
$$256 \times \frac{1749.067}{60} \times 134/10,000 = 100 \text{ HZ}$$

Now, if the divide-by-10,000 is changed to 10,050, then the above equation has an output of 99.502 Hz. The control circuitry must speed up the motor to force the output frequency to be 100 Hz which is the same as the press encoder frequency after passing through the divide-by-126 circuit. This divide-by-10,050 is achieved by dialing +0.50 into the thumbwheel switch. The magnitude of the number 10,000 has been chosen so that the least significant digit is equal to 0.01% gain per step.

Figure 3:
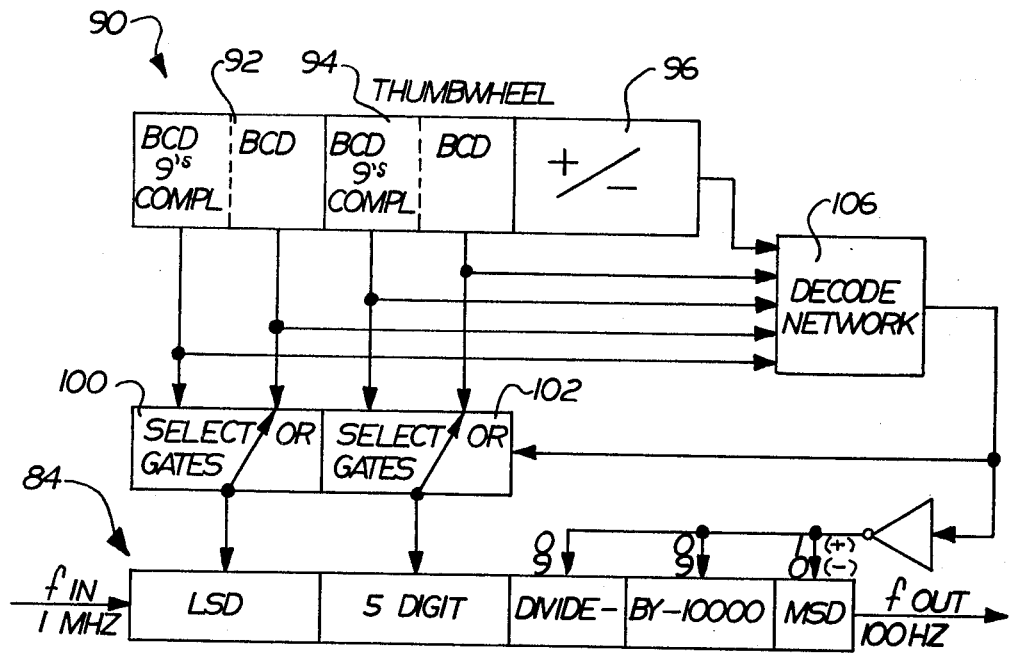
FIG. 3 is a schematic illustration of the thumbwheel switch and frequency divider circuits employed in the embodiment of FIG. 2.

The thumbwheel switch 90 and divider circuit 84 are illustrated in greater detail in FIG. 3 to which reference is now made. The divide-by-10,000 circuit 84 takes the form of a conventional five stage cascaded, programmable divide-by-N circuit having a nominal division of 10,000. The division is controlled by the setting of the thumbwheel switch 90. At a setting of plus or minus 00, the divider factor will be exactly 10,000. With this setting, the divider chain will have an output frequency at 100 Hz or an input frequency of 1 MHz. The thumbwheel switch serves to control only the two least significant digits of the counter divider. The interface between the thumbwheel switch and the counter includes a pair of selector gates 100 and 102 which serve to feed the two inputs of the divider. Thumbwheel switch has both BCD as well as BCD 9's complement of the BCD output. One or the other is routed to the counter by way of the selector gates depending upon the position of the plus-minus switch 96. The position of the switch is decoded by a decoder 106 with the positive switch position selecting BCD and the negative position selecting 9's complement. Since the thumbwheel switch controls only the two least significant digits of the counter, this will cause the counter to go as high as +10,099 or as low as 9,901 (when the 9's complement is being selected). The three most significant digits are set at 100 for a positive switch selection or 099 for a negative switch selection.

Figure 4:
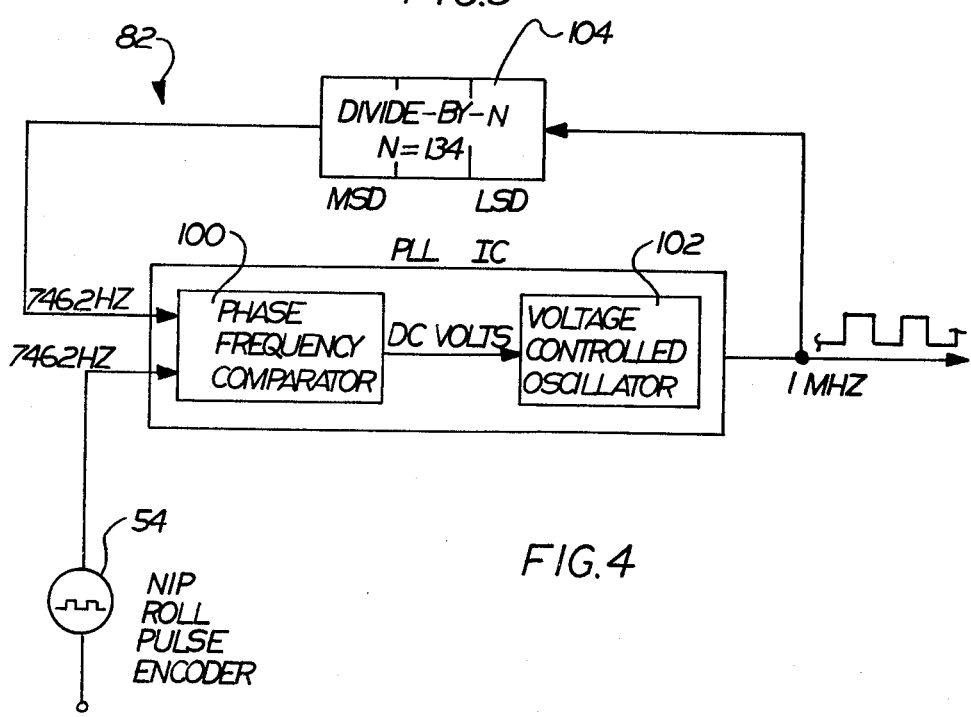
FIG. 4 is a schematic illustration of the multiplier circuit employed in the embodiment of FIG. 2.

Whereas the multiplier 82 may take various forms for converting a pulse train of one frequency rate to another, it preferably takes the form as is illustrated in FIG. 4.

Here it is seen that the encoder 54 supplies the multiplier with a pulse train, which at rated press speed is 7,462 Hz. This is supplied to a phase lock loop circuit such as the RCA Model CD 4046. This phase lock loop circuit includes a phase-frequency comparator 100 followed by a voltage controlled oscillator 102 connected in a well-known manner. The feedback path taken from the output includes a divide-by-N circuit 104 in which the division factor N is selected at a level of 134. Consequently then, the circuit will serve, at rated press speed, to provide an output pulse train having a frequency rate of 1 MHz.

Whereas the invention has been described in conjunction with a preferred embodiment, it will be appreciated that various modifications may be made without departing from the spirit and scope of the invention as defined by the appended claims.

What is claimed is:

1. In a web fed printing press having at least one printing unit including first web driving means driven by a first motor means for imparting motion to a web and downstream from said printing unit a second web driving means driven by a second motor means for receiving and imparting motion to said web prior to it being directed to utilization means, motor control means for controlling the web speed relationship at said two motor driven means comprising:
   first means for supplying a first pulse train of pulses at a pulse dependent on said first motor speed;
   second means for supplying a second pulse train of pulses at a pulse rate dependent on said second motor speed;
   control means for receiving and comparing said first and second pulse trains and controlling energization of only said second motor means in a direction to lock said second pulse rate to said first pulse rate; and,
   speed adjusting means for varying the pulse rate of said second pulse train supplied to said control means to thereby adjust the relative web speed at said first and second web driving means by effectively changing the number of pulses per revolution supplied by said second means to said control means.

2. In a printing press as set forth in claim 1, wherein said first pulse supplying means includes a first shaft encoder mounted to said first motor for supplying N pulses per shaft revolution and said second pulse supplying means includes a second shaft encoder mounted to said second motor for supplying S pulses per shaft revolution.

3. In a printing press as set forth in claim 2, wherein said speed adjusting means includes pulse conversion means for converting said S pulses per shaft revolution so that at the same web speed at said two motor driven means said first and second pulse rates are equal.

4. In a printing press as set forth in claim 3, wherein said speed adjusting means further includes means for effectively varying the value of S so that a change may be effected in the relative web speed at said two web driving means.

5. In a printing press as set forth in claim 3, wherein said pulse conversion means includes frequency divider means for dividing down the pulse rate of pulses supplied by said second encoder by a factor F.

6. In a printing press as set forth in claim 5, wherein said speed adjusting means further includes means for adjusting the value of said factor F.

7. In a printing press as set forth in claim 6, wherein said dividing means is a digital pulse rate divider for dividing by said factor F.

8. In a printing press as set forth in claim 7, wherein said factor adjusting means includes a manually adjustable means for varying the magnitude of said factor F.

9. In a printing unit as set forth in claim 8, wherein said factor adjusting means includes means for selectively controlling whether the change in magnitude of said factor is an increase or a decrease thereof.

* * * * *